Nov. 1, 1966  T. J. HENNIGAN  3,282,739

NON-MAGNETIC BATTERY CASE

Filed Oct. 29, 1963

INVENTOR.
THOMAS J. HENNIGAN

BY
*Earl Levy*
ATTORNEYS

United States Patent Office 3,282,739
Patented Nov. 1, 1966

3,282,739
NON-MAGNETIC BATTERY CASE
Thomas J. Hennigan, Chillum Terrace, Md., assignor to the United States of America as represented by the Administrator of the National Aeronautics and Space Administration
Filed Oct. 29, 1963, Ser. No. 319,894
12 Claims. (Cl. 136—132)

The invention described herein may be manufactured and used by or for the government of the United States of America for governmental purposes without the payment of any royalties thereon or therefor.

The present invention relates to a non-magnetic battery case, and more particularly, to a non-magnetic battery case formed of a non-magnetic woven glass tape material impregnated with an epoxy resin.

Since magnetic materials would have an adverse effect on many experiments being conducted on space vehicles and satellites, it is essential that electrochemical cells, such as nickel-cadmium, silver-cadmium, or silver-zinc, used therein have cases of non-magnetic materials.

Prior to the present invention non-magnetic cases for electrochemical cells were formed by the cells being encapsulated in an epoxy resin or from welded stainless steel. These cells had a disadvantage of not being capable of withstanding too much internal pressure before they would leak electrolyte, bulge, or burst. To prevent the bulging that occurred during the operation of the electrochemical cells housed within a welded stainless steel case, it was necessary to use clamps such as end plates and tie bolts. The welded stainless steel case, additionally, tended to possess magnetic properties due to the welding process.

The invention as will be described hereinafter has the advantage of being able to provide an inexpensive hermetically sealed case for an electrochemical system which will withstand a moderately high internal pressure and at the same time retain the non-magnetic properties desired. Whereas cells encapsulated in an epoxy resin alone have a bursting pressure of less than 150 pounds per square inch, cells, of the same size, encased, as will be described herein, are able to take a pressure greater than 300 pounds per square inch before there is any failure therein, i.e., the new casing is capable of withstanding about twice as much internal pressure as can conventional epoxy resin cases and would, accordingly, have a prolonged life. In addition, it is possible for the casing of the instant invention to achieve a weight saving of approximately 20 percent over conventional casings. Furthermore, no clamping is required as with many metal cases; there is no problem of any corrosive action due to the electrolyte; and the cell has the advantage of being more immune and resistant to shock.

Not only does the case of the instant invention possess the advantages enumerated above, but at the same time, the leak rate test has indicated its leak rate to be of the order of $10^{-7}$ cc. of helium per second (STP) which compares favorably with the prior art cell cases.

The above advantages are attained by using solid spiralled wires for terminal leads; encapsulating the cell terminals and spiralled wires attached thereto in epoxy resin and wrapping epoxy resin impregnated woven glass tape, i.e., woven glass tape which is saturated with epoxy resin upon being coated therewith, around the plastic encased cell to form a laminated casing therefor.

The exact nature of this invention, as well as other objects and advantages thereof, will be readily apparent from consideration of the following specification relating to the annexed drawings in which.

Figure 1:
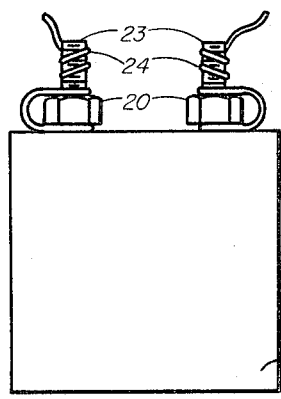
FIGURE 1 is a front view of a cell before it is encased and wherein the terminals thereof have connected thereto solid spiralled terminal wires.
Figure 2:
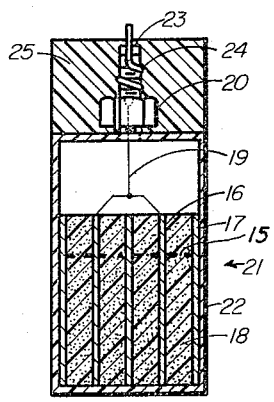
FIGURE 2 is a sectional side view of the cell of FIGURE 1 with the terminals and spiralled wires thereof encapsulated in epoxy resin.

Referring to the drawings, there is shown in FIGURES 1 and 2 a battery cell 21 encased within a plastic housing 22 and containing electrolyte 15, positive electrodes 16, negative electrodes 17, and separators 18 separating the positive and negative electrodes. Terminals 23, affixed to and forming a part of battery cell 21, are coupled by an internal coupling member 19 to the positive or negative electrodes depending on whether they are to behave as a positive or negative terminal of the battery cell. A solid terminal enamelled copper wire 24 is spiralled about each terminal 23 and connected thereto by nut 20. Both terminals 23 and the spiralled portion of terminal wires 24 are encapsulated in epoxy resin 25, as shown in FIGURE 2. The epoxy having been poured into a mold formed about terminals 23 and allowed to harden. By spiralling terminal wires 24, a long tortuous path is provided for any electrolyte leakage. Additionally, this wire is solid, rather than stranded, so that leakage paths between the strands are eliminated.

Figure 3:
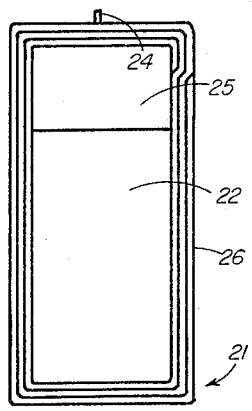
FIGURE 3 is a side view of the cell of FIGURE 2 having epoxy resin impregnated woven glass tape wound around it in one direction.

As shown in FIGURE 3, a plurality of layers, for example, three, of epoxy resin impregnated woven glass tape 26, formed from woven glass tape having been coated with epoxy resin, are wound around the front face, base, and back face of plastic housing 22 and over the top of epoxy resin 25 covering terminals 23. Tape 26, before being impregnated with epoxy resin, is chosen to have a width substantially the same as the width of front face of plastic housing 22 so that, when it is impregnated with epoxy resin and wound around plastic housing, it will cover completely the surface it encases.

Figure 4:
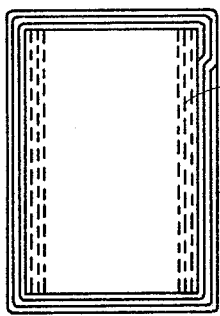
FIGURE 4 is a bottom view of the cell of FIGURE 3 having the epoxy resin impregnated woven glass tape wound around it in two directions.

To complete the casing and cover the two end surfaces of the plastic housing 22, another piece of epoxy resin impregnated woven glass tape 27, having a width substantially the height of a plastic housing 22 and epoxy resin 25 plus the thickness of the layers of tape 26 already wound around plastic housing 22, is wound around the two end surfaces and the back and front faces to form a plurality of layers thereon. FIGURE 4 shows the relationship of layers of tape 26 to the layers of tape 27, and, in particular, depicts there being three layers of each of the tapes used to form the casing for battery cell 21.

The epoxy resin impregnated woven glass tape, after encasing battery cell 21, in the manner described above, is allowed to harden to form a rigid structure about the battery cell. An even better packaging of the casing is obtained by clamping supporting members on all sides of the wrapped battery cell immediately after the tape is wrapped therearound and before hardening thereof occurs, and solidifying the casing formed from tapes 26 and 27.

It has been found that successful cell casings have been built with both the epoxy resin 25 and the epoxy impregnating the fiber glass woven material being Shell Chemical Company EPON 834 or EPON 828 epoxy resins having a catalyst of diethylenetriamine (DTA). The EPON 834 and EPON 828 resins can be properly identified by data sheets furnished by the Shell Chemical Company Division of the Shell Oil Company. EPON 828 resin is described in Data Sheet SC:60–146R dated July 1962, and EPON 834 resin is described in Products Specifications SC:60–148 dated November 1960.

Figure 6:
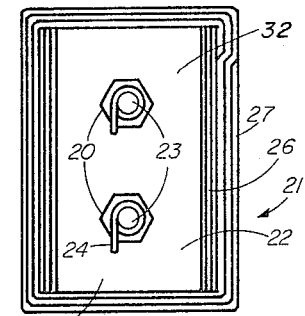
FIGURE 6 is a top view of the cell of FIGURE 1 having the epoxy resin impregnated woven glass tape enclosing all but the top surface of the cell.
Figure 5:
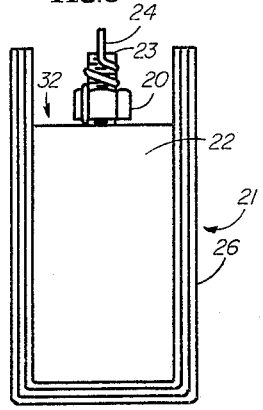
FIGURE 5 is a front view of the cell of FIGURE 1 having epoxy resin impregnated woven glass tape formed thereon in a U-shaped configuration.

Another embodiment of the invention is shown in FIGURES 5 and 6. FIGURE 5 shows the epoxy resin impregnated woven glass tape 26 cut as strips and formed in a substantially U-shaped manner about the front face, base and rear face of plastic housing 22; and FIGURE 6 illustrates the layers of tape 27 as well as the layers of tape 26, with tape 27 wrapped around the two end surfaces of the battery cell and over tape 26 on the front and rear faces of plastic housing 22. As already described in connection with the earlier described embodiment of the invention, the width of the tape strips are cut to conform with the shape of plastic housing 22. The casing and sealing of battery cell 21 is completed by epoxy resin 25 being poured over terminals 23.

The epoxy resin impregnated woven glass tape, itself, can be used to form the mold for the epoxy resin which is to be used to seal cell terminals 23. This can be accomplished by extending the tape 26 higher than the edges of the front and rear faces of plastic housing 22 and choosing the width of tape 27 so that it is wider than the height of plastic housing 22 and wrapping it so a portion thereof extends above the top thereof. The tapes 26 and 27 then form a cavity 32 which houses the terminal, extends over the top thereof, and acts as the form for the epoxy resin.

Figure 7:
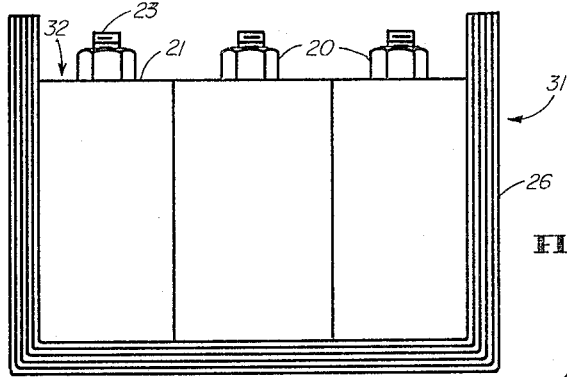
FIGURE 7 is a front view showing a plurality of cells formed in a compact unit by epoxy resin impregnated woven glass tape covering portions thereof.
Figure 8:
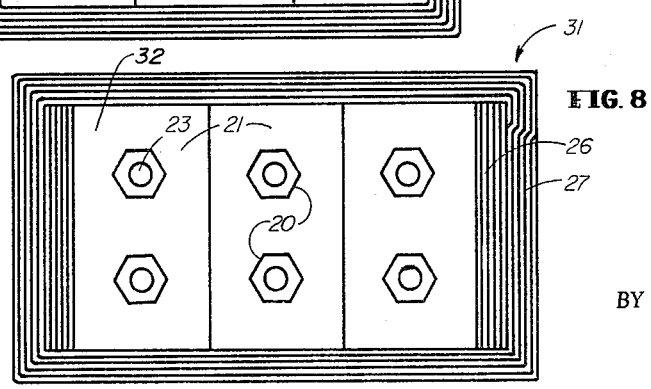
FIGURE 8 is a top view showing a plurality of cells having all extremities except their supper surfaces covered by layers of epoxy resin impregnated woven glass tape.

Should it be desired to form a compact battery 31 of the number of battery cells 21, the battery cells can be placed together side by side in a manner shown in FIGURES 7 and 8 and be encased in the epoxy resin impregnated woven glass tape in the same manner as described for encasing a single battery cell. This compact battery can be formed of cells which have or have not already been previously encased in the manner described hereinabove.

In FIGURE 7 compact battery 31, formed of a plurality of battery cells 21, is encased in the same manner as depicted in FIGURE 6 for a single battery cell. The plurality of battery cells 21 are placed together with the rear face of one cell resting against the front face of an adjacent cell and with tape 26 formed as layers extending from above the front face of one extreme cell along the face thereof, down along the bases of all the cells and then up again along the rear face of the other extreme cell and slightly above it.

As already described in connection with FIGURE 6 tape 27 in FIGURE 8 is chosen to have a width greater than the height of the battery cells 21 forming the compact battery so that when it is wrapped around all the end surface of the individual cells and tape 26, on the front and rear surfaces of the two extreme cells, respectively, it forms, in conjunction with the extremities (extended portions shown in FIGURE 7) of tape 26, a cavity 32 into which epoxy resin is poured to complete the battery casing assembly and sealing after the terminal wires and intercell connectors (not shown) are connected to the terminals thereof.

As already described above in connection with a single battery cell, the epoxy resin impregnated woven glass tape casing structure for the compact battery can harden by itself or be encased in a mold until the casing is formed as a solid structure, the mold to be removed after the hardening occurs.

While the casings for the cells are described as being of epoxy resin impregnated woven glass tape, non-magnetic expanded metals, such as stainless steel, copper, or silver can be used as the reinforcing tape in place of the woven glass. The method of potting and wrapping would be similar.

The foregoing disclosure relates to preferred embodiments of the invention. Numerous modifications or alterations may be made therein without departing from the spirit and scope of the invention set forth in the appended claims.

What is claimed is:

1. An electrochemical device including an outer housing having terminals affixed thereto and containing therein an electrolyte, positive and negative electrodes and separators positioned between said positive and negative electrodes, the improvement comprising: an epoxy resin impregnated woven glass tape formed about said housing.

2. An electrochemical device having an outer housing including a front face, a rear face, end surfaces, a base and a top; terminals affixed to said top; and containing therein an electrolyte, positive and negative electrodes and separators positioned between said positive and negative electrodes, the improvement comprising: terminal wires equal in number to the number of said terminals, each having a portion thereof spiralled about the terminal with which it is associated and an epoxy resin coated flexible tape formed about said housing.

3. The electrochemical device of claim 2 wherein said epoxy resin coated flexible tape comprises: first layers thereof formed about said base, said front face and said rear face and extending above said top from said front face and said rear face; and second layers thereof formed about said end surfaces and the top layer of said first layers of said tape positioned on said front face and said rear face, said second layers having a portion thereof extending above said top of said housing.

4. The electrochemical device of claim 3 further including: epoxy resin encapsulating said terminals and said spiralled portions of said terminal wires attached thereto and being contained by the portions of said first layers and said second layers extending above said top of said housing.

5. The electrochemical device of claim 2 further including epoxy resin encapsulating said terminals and said portions of said terminal wires spiralled about said terminals and forming with said housing a unitized structure.

6. The electrochemical device of claim 5 wherein said epoxy resin coated flexible tape comprises: first layers thereof wrapped around said front face, said base, said rear face and said epoxy resin encapsulating said terminals; and second layers thereof wrapped round said end surfaces, and the top layer of said first layers of said tape positioned on said front face and said rear face.

7. In the electrochemical device of claim 6, the tape forming said first layers being of a width substantially equal to the width of said front face and the tape forming said second layers being of a width substantially equal to the height of said front face plus the height of said epoxy resin encapsulating said terminals.

8. In a battery structure wherein said battery has a front face, a rear face, end surfaces, a base and a top, the improvement comprising a casing having: first layers of epoxy resin impregnated flexible tape formed about said front face, said base, said rear face and said top of said battery; and second layers of epoxy resin impregnated flexible tape formed about said end surfaces of said battery and top layer of said first layers of said tape positioned on said front face and said rear face of said battery.

9. In the battery structure of claim 8, the tape forming said first layers being of a width substantially equal to the width of said front face; the tape forming said second layers being of a width substantially equal to the height of said front face; and said first and second layers of epoxy resin impregnated flexible tape being epoxy resin impregnated woven glass.

10. A casing for a multicell electrochemical structure comprising: a plurality of battery cells positioned side by side with the front face of each cell resting against the rear face of an adjacent cell; and epoxy resin impregnated woven glass tape formed about said plurality of battery cells with first layers thereof wrapped around the front face and the rear face, respectively, of the two extreme battery cells forming said plurality of battery cells and the tops and the bases of all of said plurality of battery cells; and second layers thereof wrapped around the end surfaces of all said plurality of battery cells and the top layer of said first layers of said tape positioned on said front face and said rear face, respectively, of said two extreme battery cells.

11. A casing for a multicell electrochemical structure comprising: a plurality of battery cells positioned side by side with the front face of each cell resting against the rear face of an adjacent cell; and epoxy resin impregnated woven glass tape formed about said plurality of battery cells with first layers thereof wrapped around the front face and the rear face, respectively, of the two extreme battery cells forming said plurality of battery cells and the bases of all said plurality of battery cells and extending above the tops of said plurality of battery cells from said front face and said rear face, respectively, of said two extreme battery cells; and second layers thereof wrapped around the end surfaces of said plurality of battery cells and the top layer of said first layers of said tape positioned on said front face and said rear face, respectively, of said two extreme battery cells, said second layers extending above the tops of said plurality of said battery cells.

12. The electrochemical structure of claim 11 further including epoxy resin contained by the portions of said first layers and said second layers extending above said tops of said plurality of said battery cells.

References Cited by the Examiner
UNITED STATES PATENTS

| | | |
|---|---|---|
| 912,946 | 2/1909 | Eastman. |
| 2,645,676 | 7/1953 | Emeriat _____ 136—132 X |

WINSTON A. DOUGLAS, *Primary Examiner.*

ALLEN B. CURTIS, *Examiner.*

D. L. WALTON, *Assistant Examiner.*